US012110819B1

(12) United States Patent
Vinski et al.

(10) Patent No.: US 12,110,819 B1
(45) Date of Patent: Oct. 8, 2024

(54) SIDE PLATE FOR ROTARY ENGINE

(71) Applicant: PRATT & WHITNEY CANADA CORP., Longueuil (CA)

(72) Inventors: Johnny Vinski, Châteauguay (CA); Vincent Savaria, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/470,791

(22) Filed: Sep. 20, 2023

(51) Int. Cl.
*F02B 55/08* (2006.01)
*F02B 53/00* (2006.01)

(52) U.S. Cl.
CPC .............. *F02B 55/08* (2013.01); *F02B 53/00* (2013.01); *F02B 2053/005* (2013.01)

(58) Field of Classification Search
CPC .......... F02B 55/08; F02B 55/14; F02B 53/00; F02B 2053/005; F16J 9/12; F01C 21/106; F01C 21/22; F01C 21/06; F01C 21/108; F04C 2240/30
USPC ................... 123/18, 18 R, 43 A, 45 A, 45 R, 123/200–249; 418/140, 187, 61.1
See application file for complete search history.

(56) References Cited

U.S. PATENT DOCUMENTS

| | | | | |
|---|---|---|---|---|
| 4,741,308 A | 5/1988 | Ballinger | | |
| 7,306,427 B2 * | 12/2007 | Ahlroth | F04D 29/622 | 415/173.1 |
| 8,272,823 B2 * | 9/2012 | Ahlroth | F04D 29/167 | 411/389 |
| 9,841,023 B2 * | 12/2017 | Tanaka | F04C 18/3441 | |
| 10,072,566 B2 | 9/2018 | Mlleneuve et al. | | |
| 11,333,068 B1 | 5/2022 | Savaria et al. | | |
| 11,761,376 B1 * | 9/2023 | Vinski | F01C 1/22 | 123/200 |
| 2016/0160324 A1 * | 6/2016 | Okun | C22C 21/00 | 428/558 |

FOREIGN PATENT DOCUMENTS

| | | |
|---|---|---|
| CA | 3060734 | 6/2020 |

OTHER PUBLICATIONS https://www.billetrotary.com.au/.

* cited by examiner

*Primary Examiner* — Dapinder Singh
(74) *Attorney, Agent, or Firm* — NORTON ROSE FULBRIGHT CANADA LLP

(57) ABSTRACT

A side housing for a rotary internal combustion engine, has: a side wall defining first threads, the first threads extending around a central axis; a side plate having a rotor-engaging side facing away from the side wall and a back side opposite the rotor-engaging side and facing the side wall; and a nut rotatable relative to the side plate about the central axis, the nut and the side plate axially locked to one another, the nut defining second threads extending around the central axis, the side plate secured to the side wall via a threading engagement between the first threads of the side wall and the second threads of the nut.

20 Claims, 12 Drawing Sheets

SIDE PLATE FOR ROTARY ENGINE

TECHNICAL FIELD

The application relates generally to internal combustion engines and, more particularly, to rotary internal combustion engines.

BACKGROUND

Combustion chambers of a rotary engine, such as a Wankel engine, are delimited radially by the rotor and rotor housing and axially by the two end walls. The end walls facing the combustion chamber are subjected to high pressure and thermal loads. On the other hand, the end walls must provide the running surface for the rotor's side seals.

SUMMARY

In one aspect, there is provided a side housing for a rotary internal combustion engine, comprising: a side wall defining first threads, the first threads extending around a central axis; a side plate having a rotor-engaging side facing away from the side wall and a back side opposite the rotor-engaging side and facing the side wall; and a nut rotatable relative to the side plate about the central axis, the nut and the side plate axially locked to one another, the nut defining second threads extending around the central axis, the side plate secured to the side wall via a threading engagement between the first threads of the side wall and the second threads of the nut.

The side housing may include any of the following features, in any combinations.

In some embodiments, the nut has a radially-inner face oriented towards the central axis and a radially-outer face oriented away from the central axis, the radially-outer face defining the second threads, the radially-inner face located radially inwardly of a central hole of the side plate, the radially-inner face defining torquing faces engagable by a tool for rotating the nut about the central axis.

In some embodiments, the nut and the side plate are axially locked to one another via a retaining ring.

In some embodiments, the side plate defines a protrusion extending from a back face of the side plate, the nut having a web and a flange extending axially from the web, the flange and the protrusion axially overlapping one another, the retaining ring disposed radially between the protrusion and the flange.

In some embodiments, a portion of the flange of the nut is received within a groove defined by the side plate.

In some embodiments, the retaining ring defines a first axial face oriented towards the side wall, a second axial face oriented towards the side plate, an inner face oriented towards the central axis, and an outer face oriented away from the central axis, the retaining ring defining a chamfer at an intersection between the first axial face and the outer face.

In some embodiments, the nut defines a nut groove at the flange and the protrusion defines a protrusion groove, the retaining ring received conjointly within both of the protrusion groove and the nut groove.

In some embodiments, the protrusion is monolithic with a remainder of the side plate.

In some embodiments, the side wall defines a recess surrounded by a radially-inner face oriented towards the central axis, the radially-inner face defining the first threads, the nut received within the recess, the nut having a radially-outer face oriented away from the central axis, the second threads defined by the radially-outer face.

In some embodiments, a depth of the recess is greater than an axial width of the nut, an annular space located between a bottom face of the recess and the nut.

In some embodiments, a sealing member is received within a groove defined by one or more of the side plate and the side wall, the sealing member being located radially-outwardly of the first threads and of the second threads and compressed between the side plate and the side wall.

In yet another aspect, there is provided a rotary internal combustion engine comprising: a rotor; an outer body circumscribing a rotor cavity, the rotor received within the rotor cavity and rotatable within the rotor cavity relative to the outer body, the outer body having a rotor housing extending around a central axis, and side housings mounted to the rotor housing, the rotor cavity extending axially between the side housings, a side housing of the side housings having: a side wall, first threads defined by the side wall and extending around a central axis; a side plate having a rotor-engaging side facing the rotor a back side opposite the rotor-engaging side and facing the side wall; and a nut axially locked to the side plate and rotatable relative to the side plate, the nut having second threads threadingly engaged with the first threads of the side wall.

The rotary internal combustion engine may include any of the following features, in any combinations.

In some embodiments, the nut extends from a radially-inner face oriented towards the central axis to a radially-outer face oriented away from the central axis, the radially-outer face defining the second threads, the radially-inner face located radially inwardly of a central hole of the side plate, the radially-inner face defining torquing faces to be engaged by a tool for rotating the nut about the central axis.

In some embodiments, the nut and the side plate are axially locked to one another via a retaining ring.

In some embodiments, the side plate defines a protrusion extending from a back face of the side, the nut having a web and a flange extending axially from the web, the flange and the protrusion axially overlapping one another, the retaining ring disposed radially between the protrusion and the flange.

In some embodiments, the nut defines a nut groove at the flange and the protrusion defines a protrusion groove, the retaining ring received conjointly within both of the protrusion groove and the nut groove.

In some embodiments, the protrusion is monolithic with a remainder of the side plate.

In some embodiments, the side wall defines a recess surrounded by a radially-inner face defining the first threads, the radially-inner face oriented towards the central axis, the nut received within the recess, the nut having a radially-outer face oriented away from the central axis, the second threads defined by the radially-outer face.

In some embodiments, a depth of the recess is greater than an axial width of the nut, an annular space located between a bottom face of the recess and the nut.

In some embodiments, a sealing member is received within a groove defined by one or more of the side plate and the side wall, the sealing member being located radially-outwardly of the first threads and of the second threads and in abutment against the back face of the side plate.

BRIEF DESCRIPTION OF THE DRAWINGS

Reference is now made to the accompanying figures in which.

DETAILED DESCRIPTION

Figure 1:
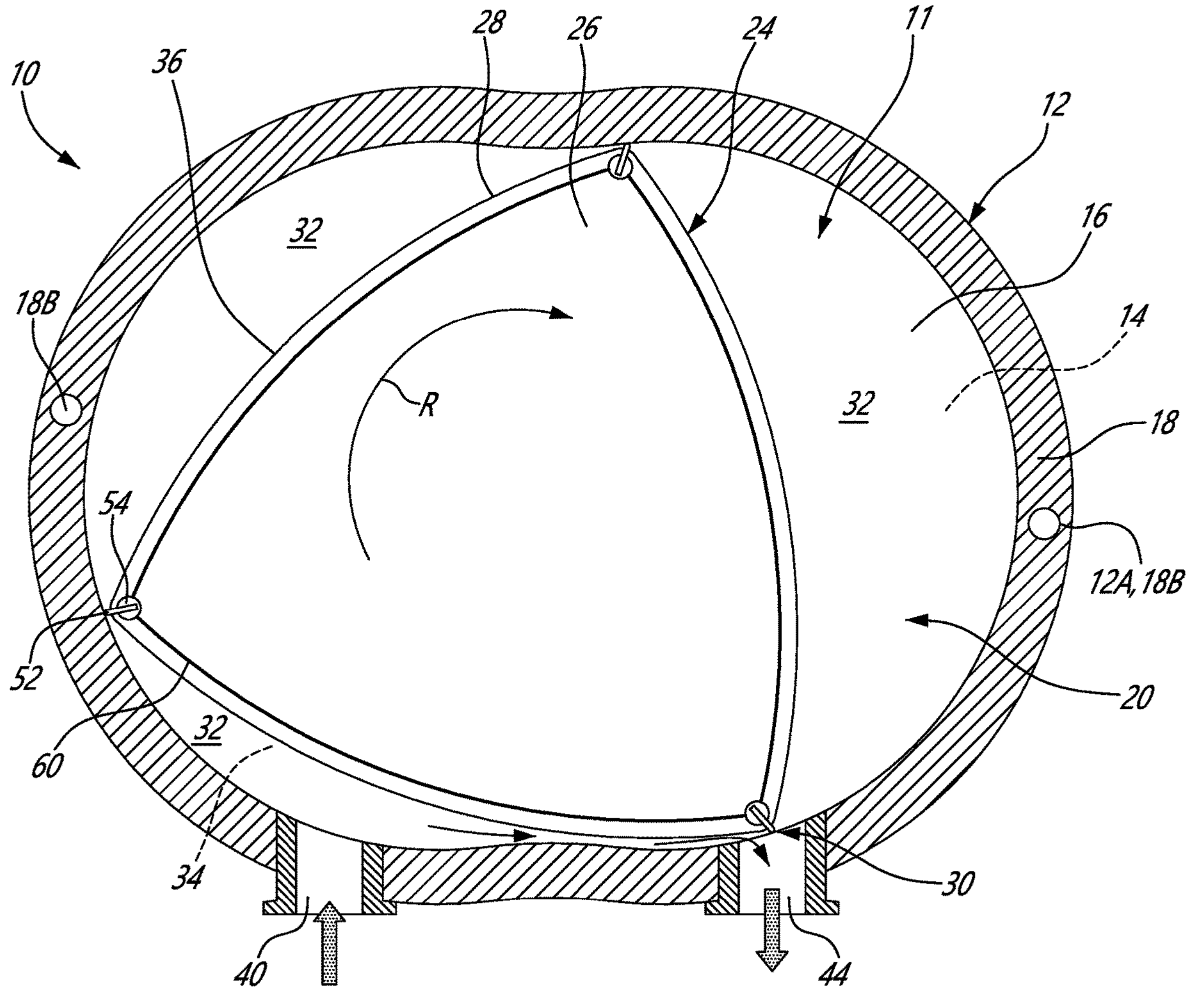
FIG. 1 is a schematic cross-sectional view of a rotary internal combustion engine in accordance with one embodiment.

Referring to FIG. 1, a rotary internal combustion engine, referred to simply as a rotary engine 10 below, which may be a Wankel engine, is schematically shown. The rotary engine 10 comprises an outer body 12, also referred to as a housing assembly since it includes a plurality of housings mounted to one another. The outer body 12 has axially-spaced side housings 11, which each includes a side wall 14 and a side plate 16 mounted to the side wall 14, with a peripheral wall 18 extending from one of the side housings 11 to the other, to form a rotor cavity 20. In FIG. 1, the side wall 14 is indicated with a dashed line because it sits behind the side plate 16. The inner surface of the peripheral wall 18 of the cavity 20 has a profile defining two lobes, which may be an epitrochoid.

The outer body 12 includes a coolant circuitry 12A, which may include a plurality of coolant conduits 18B defined within the peripheral wall 18. As shown more clearly in FIG. 5, the coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44. In the embodiment shown, the ports 40, 44 are defined in the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the outer body 12 is illustrated. As briefly introduced above, the side housings 11 include the side walls 14 that are secured to the peripheral wall 18. Each of the side walls 14 has a portion located proximate an outer perimeter P (FIG. 4) of the side wall 14 and configured to be in abutment against the peripheral wall 18 for defining the rotor cavity 20.

In the embodiment shown, each of the side walls 14 is configured to be secured to a respective one of opposed ends of the peripheral wall 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16.

It will be appreciated that, in some embodiments, the rotary engine may include more than one rotor. In such a case, the outer body 12 includes two side housings 11 and one or more intermediate housing(s) disposed between the two side housings 11. Each of the one or more intermediate housing may include an intermediate wall and two intermediate plates disposed on opposite sides of the intermediate wall. The two intermediate plates, as for the side plates, define the running face against which the rotor 24 rides during use. The intermediate housing thus defines running faces for both rotors. Thus, the description below, which focuses on the side wall and the side plate, may also apply to the intermediate wall and intermediate plates. Hence, the principle of the present disclosure applies to both the side housing and the intermediate housing.

Figure 4:
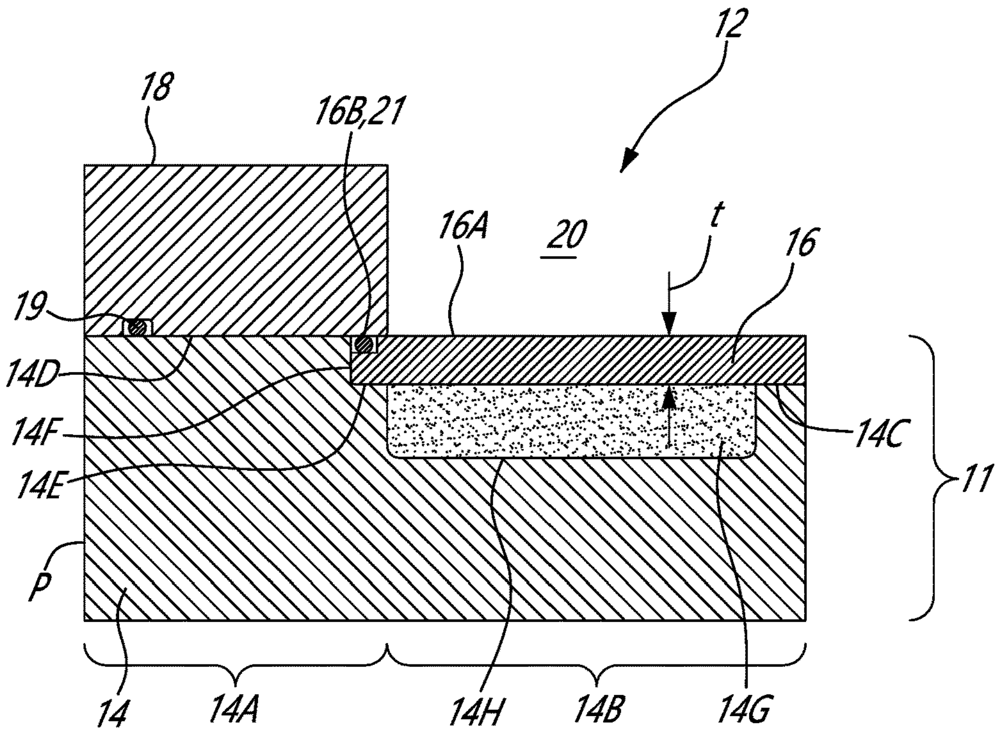
FIG. 4 is a schematic cross-sectional view taken along line B-B of FIG. 2 in accordance with one embodiment.

Referring more particularly to FIG. 4, the side wall 14 includes a peripheral section 14A, which is in abutment with the peripheral wall 18, and a center section 14B, which is circumferentially surrounded by the peripheral section 14A. In the disclosed embodiment, the peripheral section 14A of the side wall 14 is secured to the peripheral wall 18. The center section 14B of one of the side walls 14 faces the center section 14B of the other of the side walls 14. The side walls 14 are secured to the peripheral wall 18 with any suitable means known in the art. As shown, a sealing member 19 is located between the peripheral wall 18 and the peripheral sections 14A of the side walls 14 for limiting coolant from leaking out. The sealing member 19 may be a O-ring. The sealing member 19 may be received within an annular recess, which may be defined by one or more of the peripheral wall 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the peripheral wall 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the peripheral wall 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the peripheral wall 18 and the side wall 14 might be minimized.

To limit axial movements of the side plate 16 relative to the axis of rotation of the rotor 24 (FIG. 1), a periphery of the side plate 16 is contained axially between the peripheral wall 18 and the side wall 14. In other words, the periphery of the side plate 16 is sandwiched between the side wall 14 and the peripheral wall 18. A sealing member 21 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the sealing member 21 is contained within a recess 16B defined by the side plate 16. The sealing member 21 may be an O-ring. Any suitable sealing member may be used.

In a particular embodiment, the sealing member 21 and the abutment surface 14F of the side wall 14 allows the side plate 16 to move radially relative to the side wall. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansions.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuitry 12A and is in fluid flow communication with the coolant conduits 18B that are defined in the peripheral wall 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
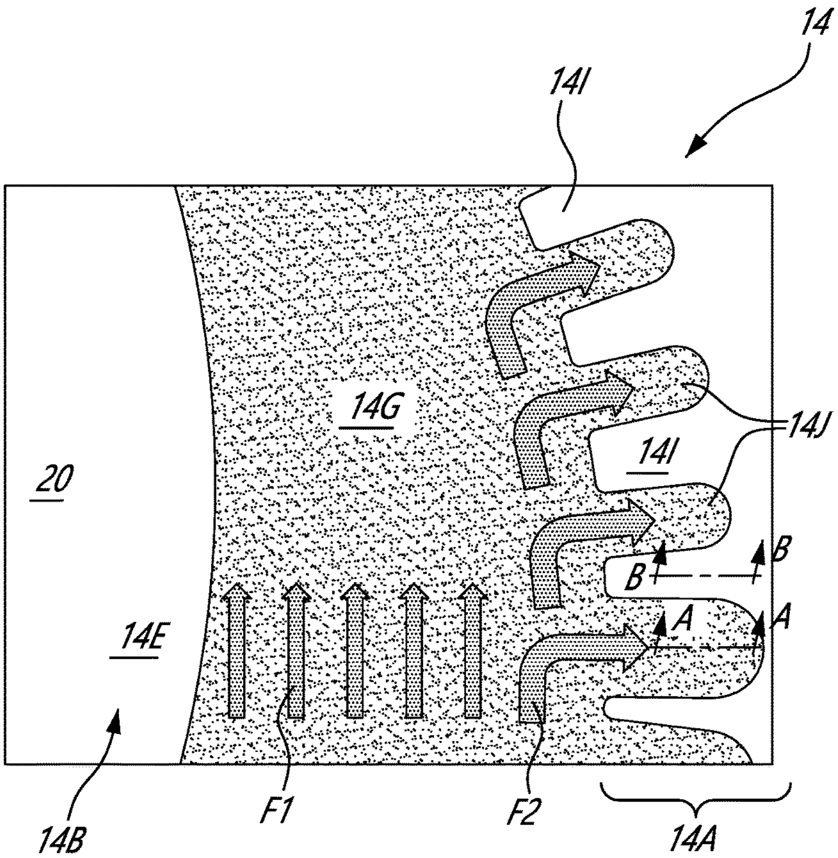
FIG. 2 is a schematic fragmented top view of a side wall of a housing of the rotary internal combustion engine of FIG. 1.
Figure 3:
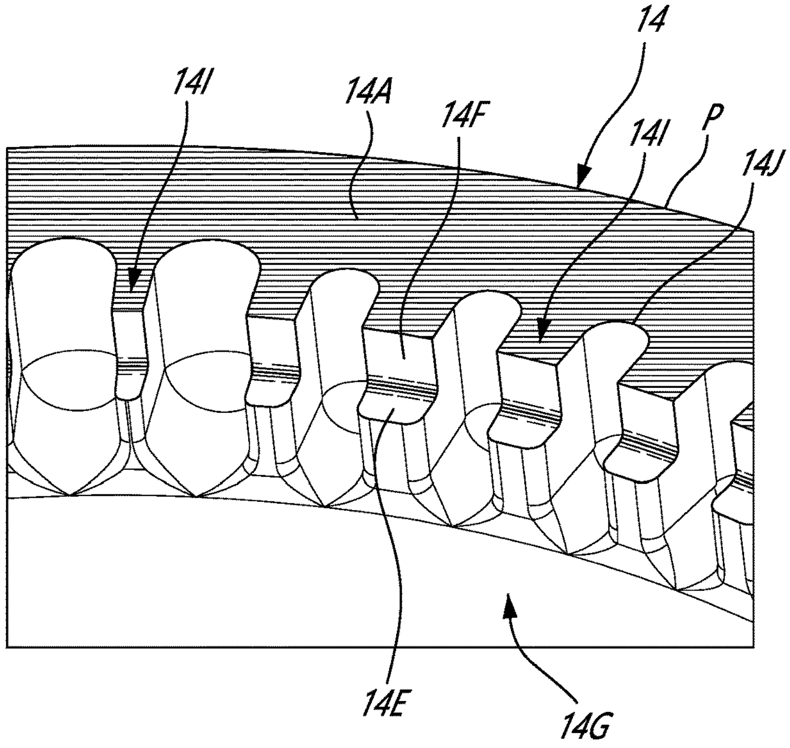
FIG. 3 is a schematic fragmented three-dimensional view of the side wall of FIG. 2.

As shown in FIGS. 2-3, the peripheral section 14A of the side wall 14 defines a plurality of ribs 14I that are circumferentially distributed around the rotor cavity. The ribs 141 defines the abutment surface 14F and a portion of the surface 14E of the center section 14B of the side wall 14. Consequently, and in the depicted embodiment, the abutment surface 14F is defined by a plurality of surfaces defined by the ribs 141. The ribs 141 may be configured to support a pressure load imparted by a combustion of a mixture of air and fuel within the combustion chambers 32.

Cavities or spaces 14J are defined between the ribs 141. More specifically, each pair of two consecutive ones of the ribs 141 defines a space 14J therebetween. The spaces 14J are in fluid communication with the pocket 14G and with the coolant conduits 18B of the peripheral wall 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the peripheral wall 18. It is understood that the liquid coolant may be circulated in closed loop and through a heat exchanger. The heat exchanger may be used to dissipate heat to an environment outside the engine; the heat transferred from the engine to the liquid coolant.

Figure 5:
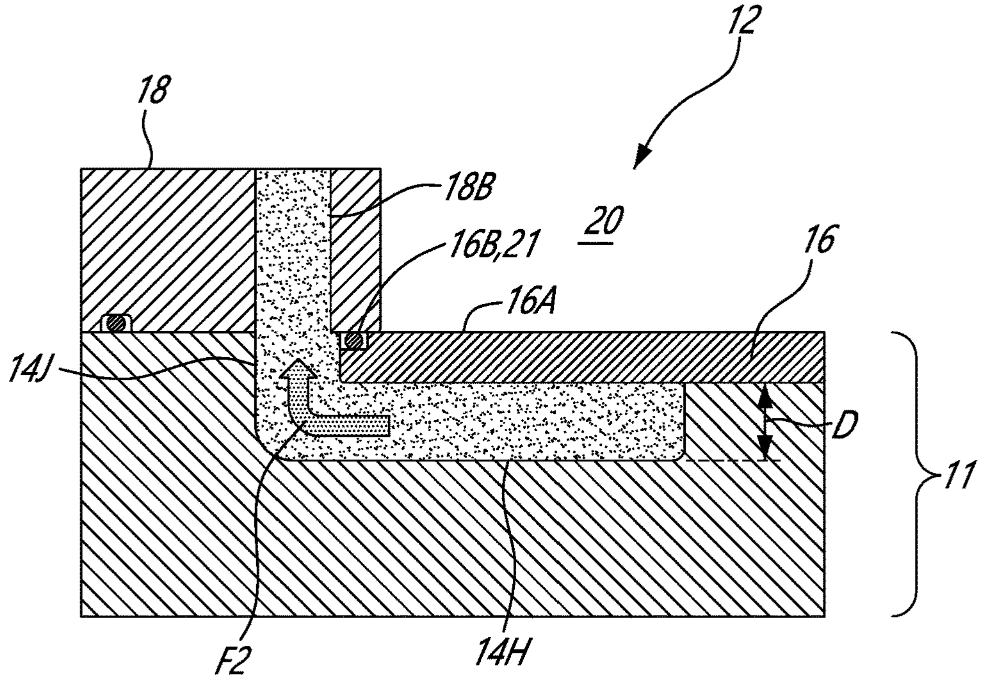
FIG. 5 is a schematic cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuitry 12A. The liquid coolant may be circulated out of the outer body 12 and within a heat exchanger for extracting the heat. The liquid coolant may then be reinjected in the coolant circuitry 12A for further heat extraction.

Figure 6:
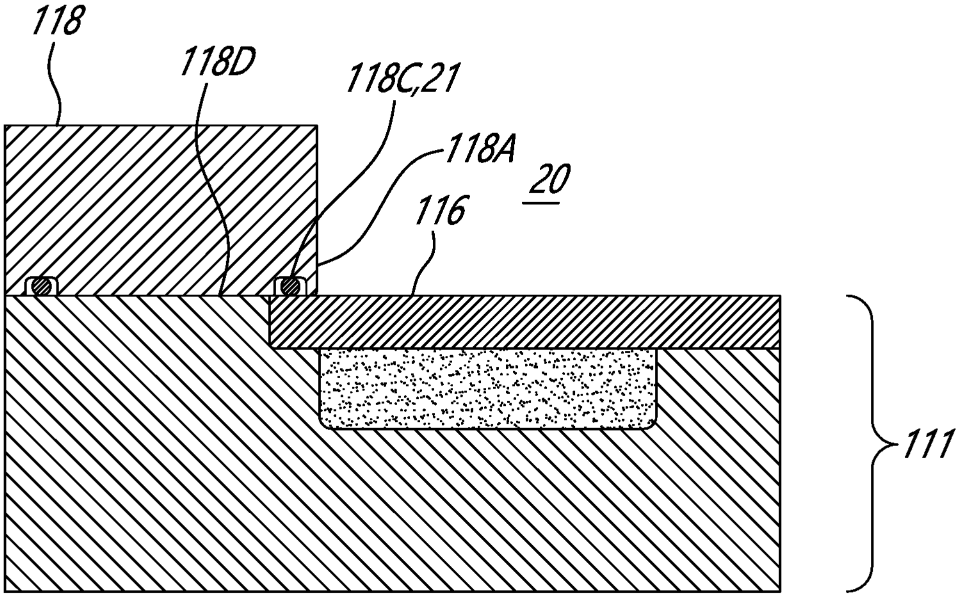
FIG. 6 is a schematic cross-sectional view taken along line B-B of FIG. 2 in accordance with another embodiment.
Figure 7:
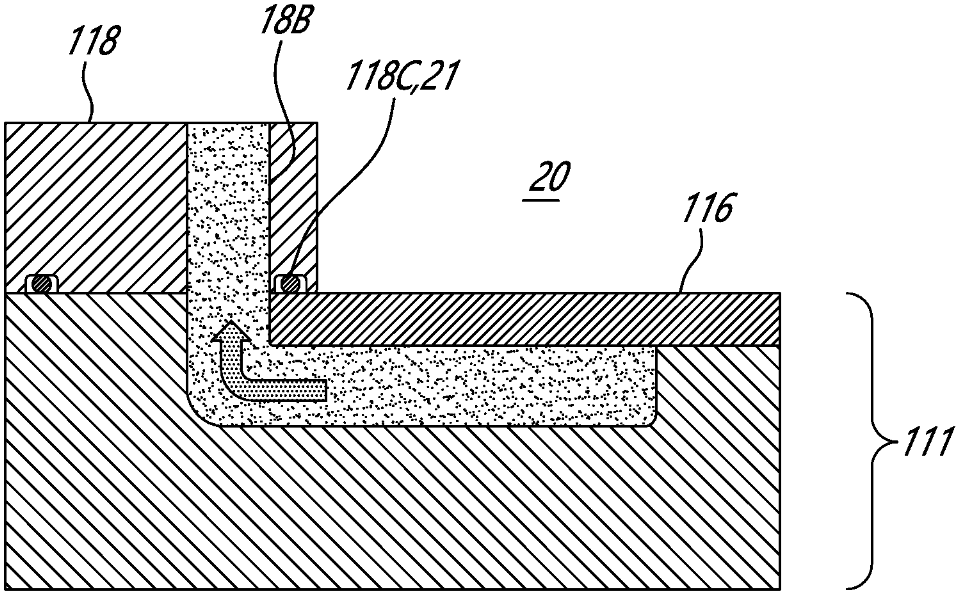
FIG. 7 is a schematic cross-sectional view taken along line A-A of FIG. 2 in accordance with the embodiment of FIG. 6.

Referring now to FIGS. 6-7, another embodiment of the outer body is generally shown. For the sake of conciseness, only elements that differ from the outer body 12 of FIGS. 2-5 are described. In the embodiment shown, the recess 118C that receives the sealing member 21 is defined by the peripheral wall 118 instead of by the side plate 116.

Figure 8:
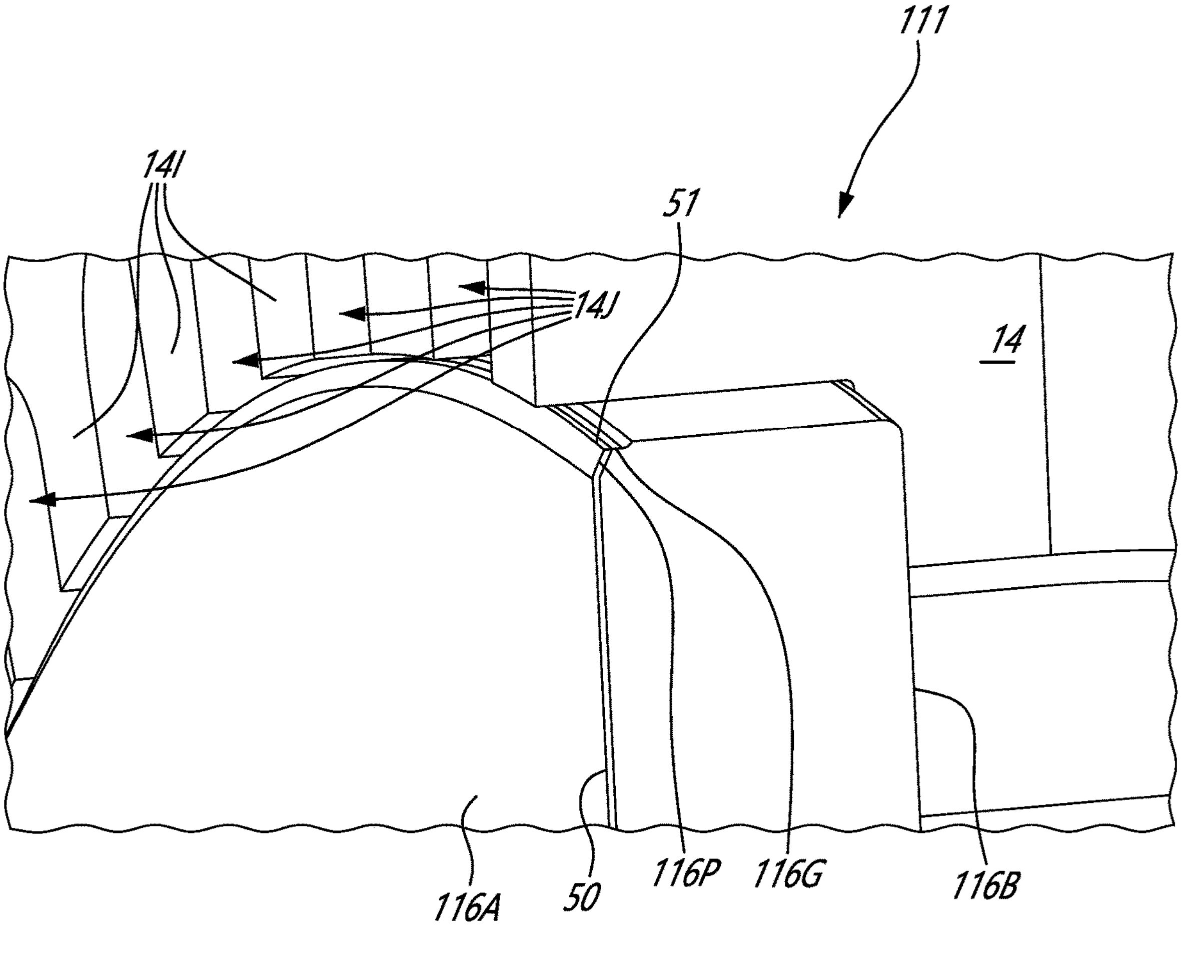
FIG. 8 is a three-dimensional cutaway view of a portion of a side housing in accordance with one embodiment.

Referring to FIG. 8, as mentioned above, the side plate 116 may be made of aluminum and is coated with a hard material such as silicon carbide or another suitable material such as chromium carbide. The coating of the side plate 116 defines the rotor-engaging face 116A on a rotor-engaging side of the side plate 116. The coating may be applied with plasma spray, high velocity oxygen fuel (HVOF), or any other suitable coating technique. The rotor-engaging face 116A may be enhanced by other techniques such as electro deposited plating (e.g., nanocrystalline CoP, Nickasil) and conversion coatings (e.g., silicon saturation). In the embodiment shown, the side plate 116 has a flared portion 116P that flares away from an end face 118D (FIG. 6) of the peripheral wall 118. The flared portion 116P extends away from a plane containing a remainder of the side plate 116. The flared portion 116P extends toward the side wall 14. The flared portion 116P is shown as being a chamfer, but may alternatively be a round over or any other suitable shape. A first coating 50 is deposited on the side plate 116. The first coating 50 extends up to a coating edge 51. The coating edge 51 is located on the flared portion 116P. Therefore, a gap or spacing is provided between the coating edge 51 and the end face 118D of the peripheral wall 118 such that the coating edge 51 is distanced from the end face 118D of the peripheral wall 118 by the spacing. The coating edge 51 is therefore free of contact with the end face 118D of the peripheral wall 118. The first coating 50 may have a substantially uniform thickness up to the coating edge 51. Or, in the alternative, the first coating 50 may tapers down toward the coating edge 51. It may tapers down to zero in thickness. In other words, the thickness of the first coating 50 may decrease toward the coating edge 51. The thickness may decrease below its nominal thickness where it covers the flared portion 116P. The first coating 50 therefore follows the shape of the flared portion 116P.

The flared portion 116P may have a first edge and a second edge located outwardly of the first edge relative to the rotation axis of the rotor 24. The first edge is located inwardly of an inner face 118A (FIG. 6) of the peripheral wall 118. The first edge is thus overlapped by the end face 118D of the peripheral wall 118. The first edge is located between the inner face 118A of the peripheral wall 118 and an outer face of the peripheral wall 118; the outer face facing away from the rotor cavity 20. Therefore, a start location of the flared portion 116P, which corresponds to the first edge, is aligned with, or is overlapped by, the peripheral wall 118 and may be offset from a coating deposited on the inner face 118A of the peripheral wall 118. Thus, the first coating 50, located on the flared portion 116P, may be free of contact with the coating 70 of the peripheral wall 118. More detail about this coating arrangement is provided in U.S. Pat. No. 11,333,068, the entire contents of which are incorporated herein by reference.

In the embodiment shown, the coating edge 51 ends at a peripheral groove 116G. A radial gap is therefore present between the side plate 116 and the abutment surface 14F of the side wall 14 at the peripheral groove 116G. The side plate outer edge geometry may alternatively include only of a simple chamfer or radius.

In some cases, the side plate may be in intimate contact with the peripheral face. Thus, when the engine stack is clamped during assembly some preload may be transferred to the coating surface. During engine operation, additional loads may be imposed to the side plate and relative slip between the mating parts may occur. After some engine running time, the coating edge area on the side plate may be progressively worn by the coating on the peripheral wall. This may initiate coating cracks and eventually coating edge spalling on the side plate. Moreover, a relatively high internal oil consumption may be exhibited due to difficulty of controlling deformations of the side plate during operation. The side plate may be fixed on the side housing with several small bolts pulling near the central portion and potentially creating local depressions on the final coated surface located on the other side of the side plate, and therefore further increasing the oil consumption because of the difficulty of the rotor side sealing grid to follow this locally deformed surface closely enough to avoid oil leaks. Also, the side plate is put in sandwich between the side wall and the peripheral wall. This creates two highly loaded axial interfaces on both sides of the side plate and may present potential areas of concern for surface fretting damage. Also, on the engine level, introducing several components in the axial stack increases the variability in positioning the bearing centers. The part geometry may be complicated at least part due to cooling passages that may be machined in the side plate to allow coolant to flow from the side wall to the peripheral wall. Fitting all these features on the side plate may limit the available design space and drives thin wall thickness at many locations. These locations may become stress risers and become potential weaker point for the part resistance to fatigue damage. Moreover, care should be taken when securing the side plate to prevent blocking oil passages.

Figure 9:
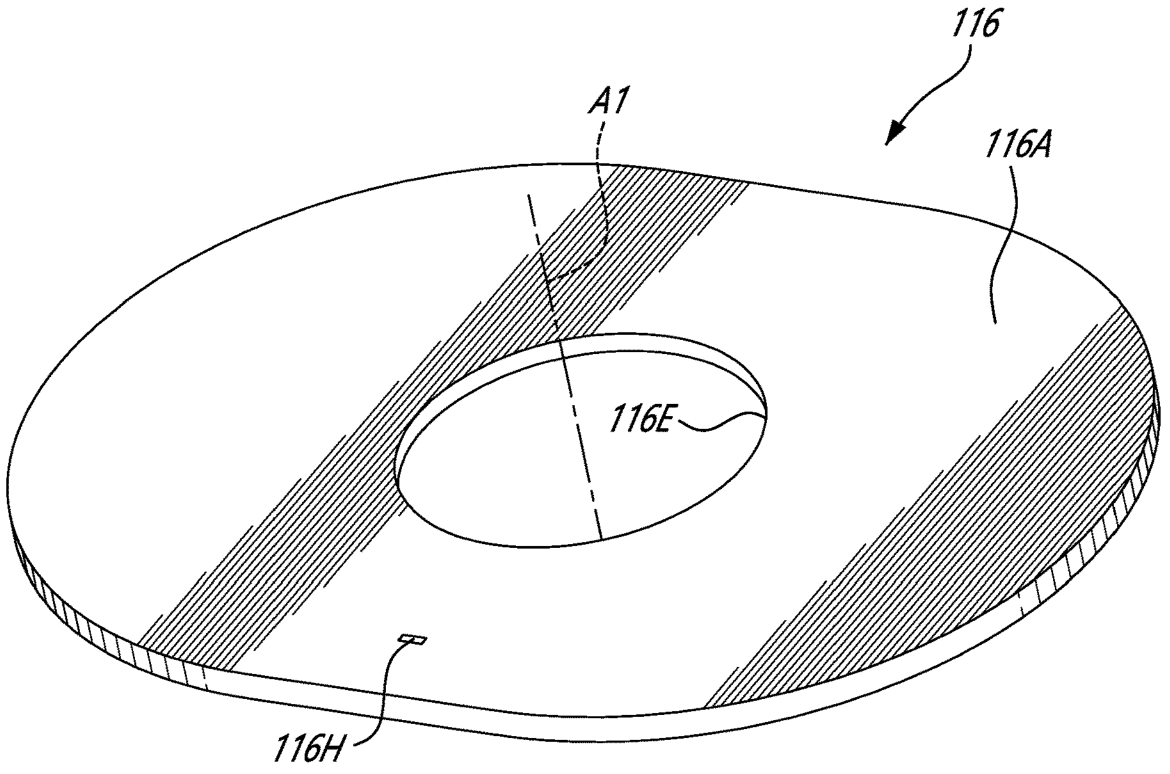
FIG. 9 is a three dimensional view illustrating a rotor-engaging face of a side plate for the side housing of FIG. 8.
Figure 10:
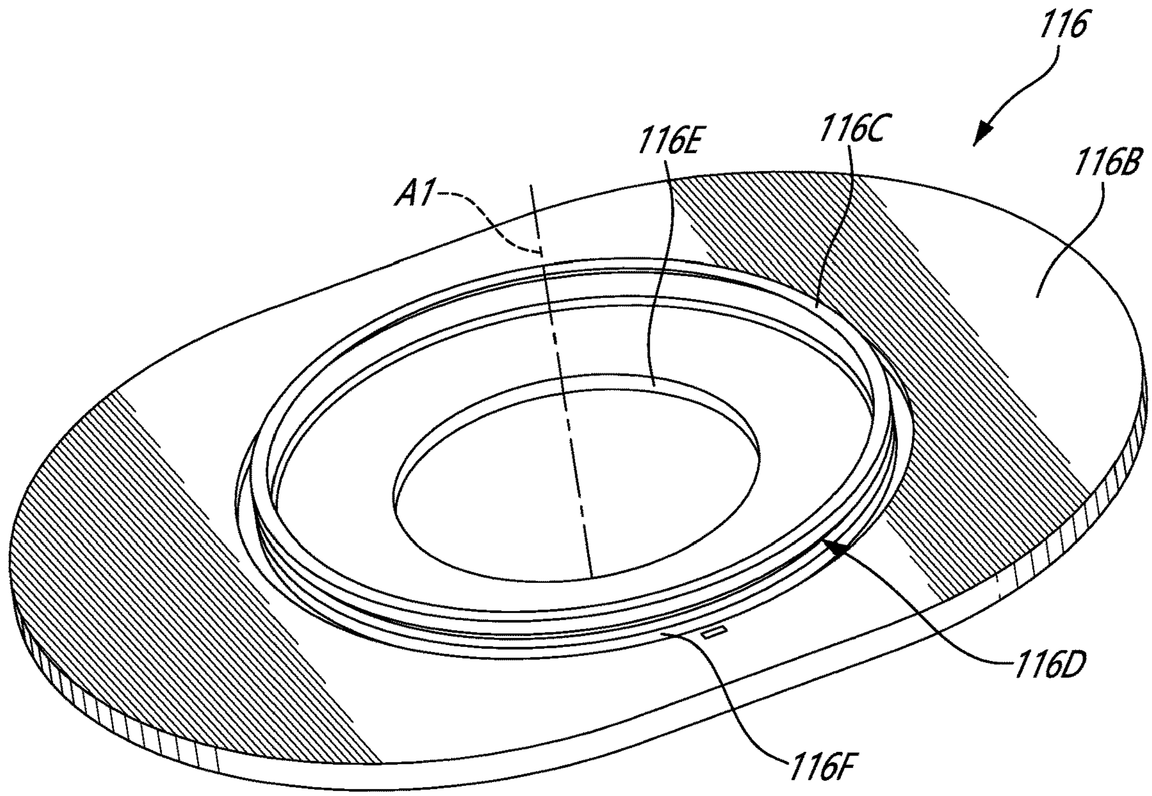
FIG. 10 is a three dimensional view illustrating a back face of the side plate of FIG. 9.
Figure 11:
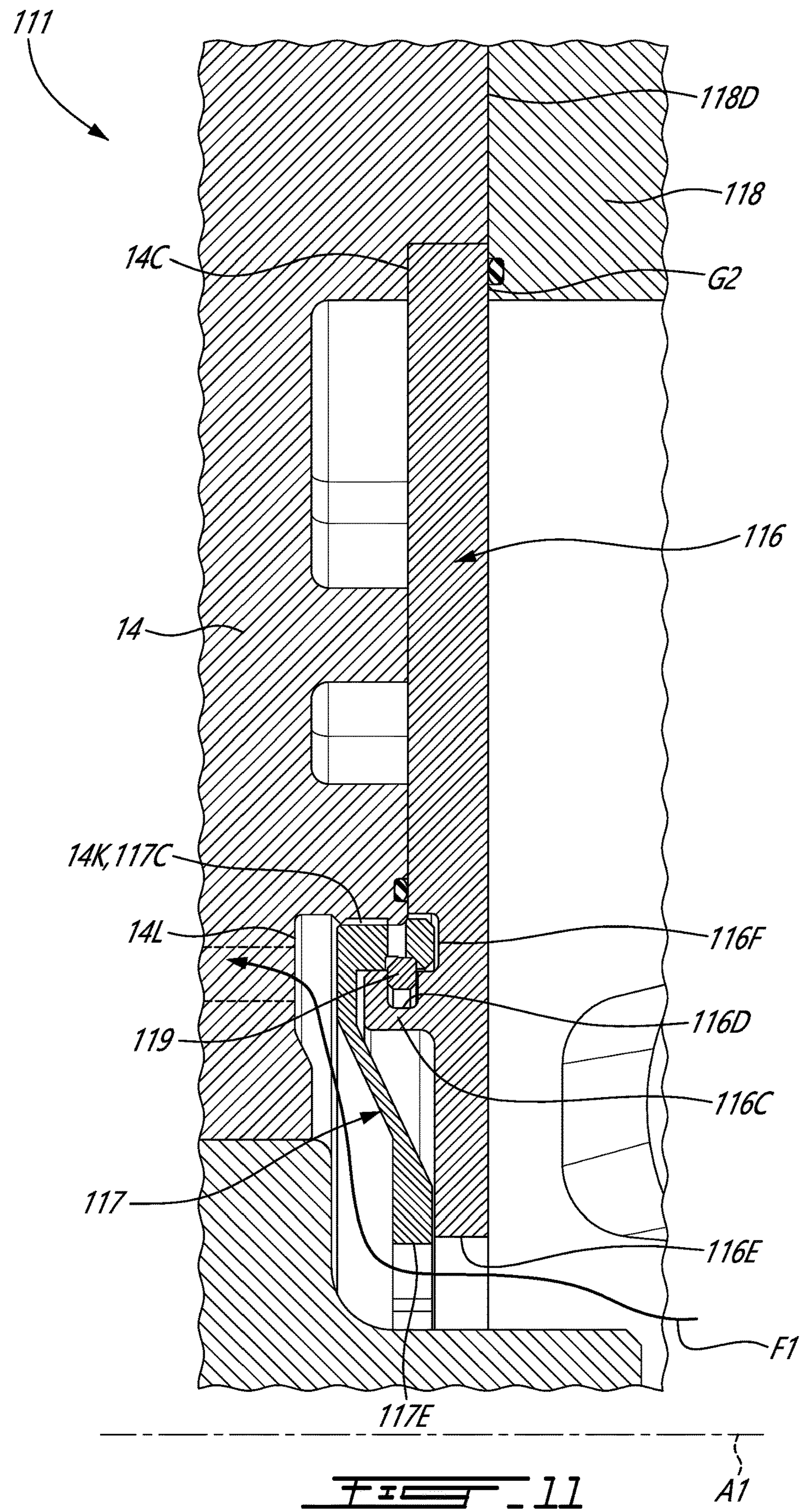
FIG. 11 is a cross-sectional view illustrating the side housing of FIG. 8 and a portion of a rotor housing.

Referring now to FIG. 9-11, features of a side plate 116 of the present disclosure may at least partially alleviate these drawbacks. The side plate 116 has a rotor-engaging side that defines a rotor-engaging face 116A facing the rotor cavity 20 and in contact with the rotor 24, and a back side that defines a back face 116B opposed to the rotor-engaging face 116A. The back face 116B faces away from the rotor cavity 20 and away from the rotor 24. The back face 116B faces the side wall 14 and may be in contact with the side wall 14. The back side of the side plate 116 defines a protrusion 116C that extends from the back face 116B and that extends away from the back face 116B and away from the rotor-engaging face 116A. In the present embodiment, and as will be explained later, the side plate 116 is secured to the side wall 14 via the protrusion 116C. The side plate 116 is non-rotatable relative to the side wall 14. The protrusion 116C and the side plate 116 may be two parts of a single monolithic body. In other words, the protrusion 116C may monolithically protrude from the back face 116B.

The protrusion 116C defines a protrusion groove 116D, which is herein located on a face of the protrusion 116C that faces a radially-outward direction. The protrusion 116C is circular and extends circumferentially a full circumference around an axis A1, which may be a central axis of the side wall 14 or of the side plate 116. This axis A1 may correspond to a rotation axis of a crank shaft of the rotary engine 10; the crank shaft engaged by the rotor. In an alternate embodiment, the protrusion 116C may include a plurality of protrusion segments circumferentially distributed about the axis A1. The segments may be spaced apart from one another. The side plate 116 defines a central hole 116E located inwardly of the protrusion 116C. The central hole 116E is surrounded by the protrusion 116C. The side plate 116 further defines a groove 116F extending from the back face 116B towards the rotor-engaging face 116A. The groove 116F is located radially outwardly of the protrusion 116C. The groove 116F thus extends around the protrusion 116C.

Figure 12:
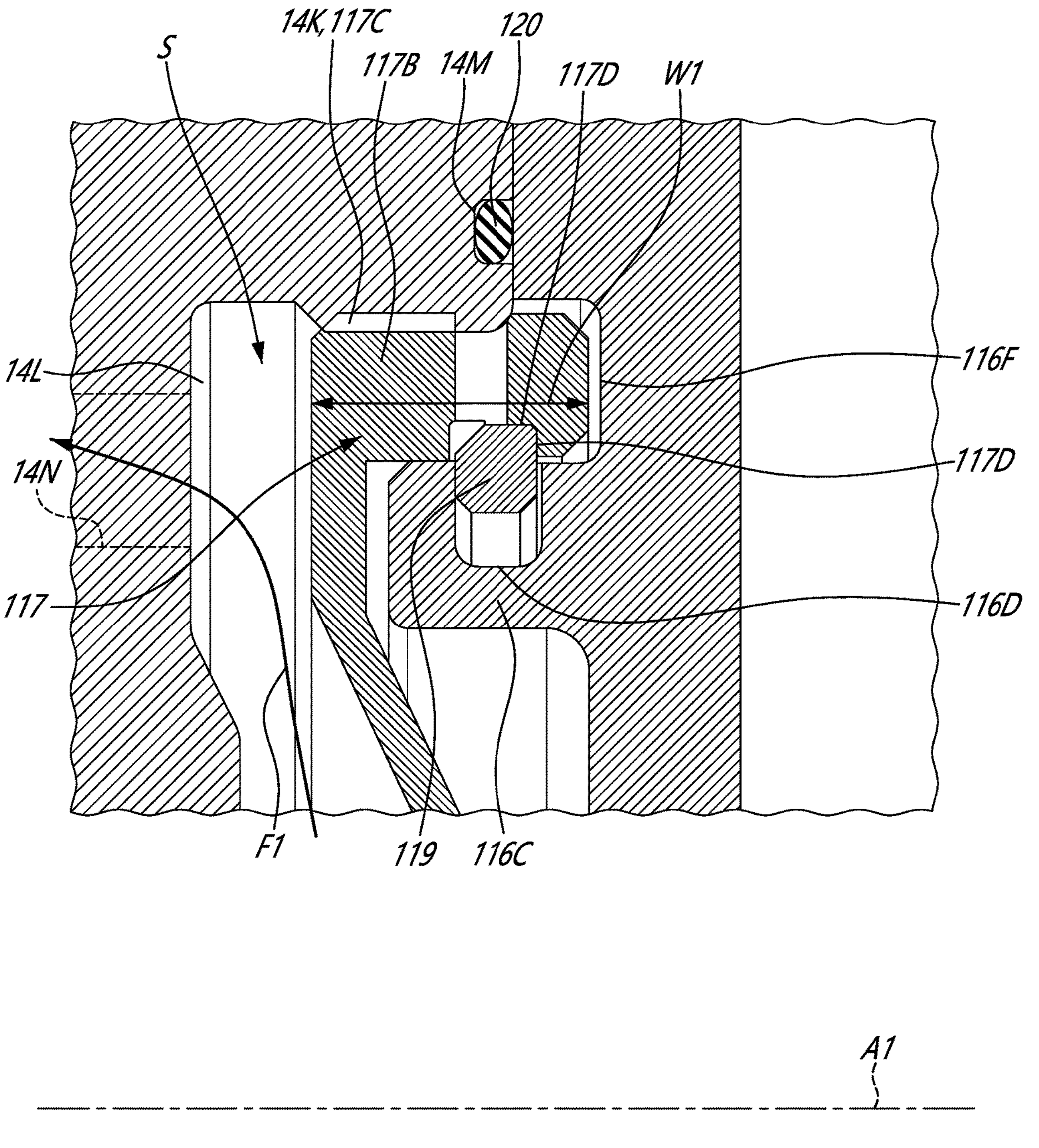
FIG. 12 is an enlarged view of a portion of FIG. 11.
Figure 13:
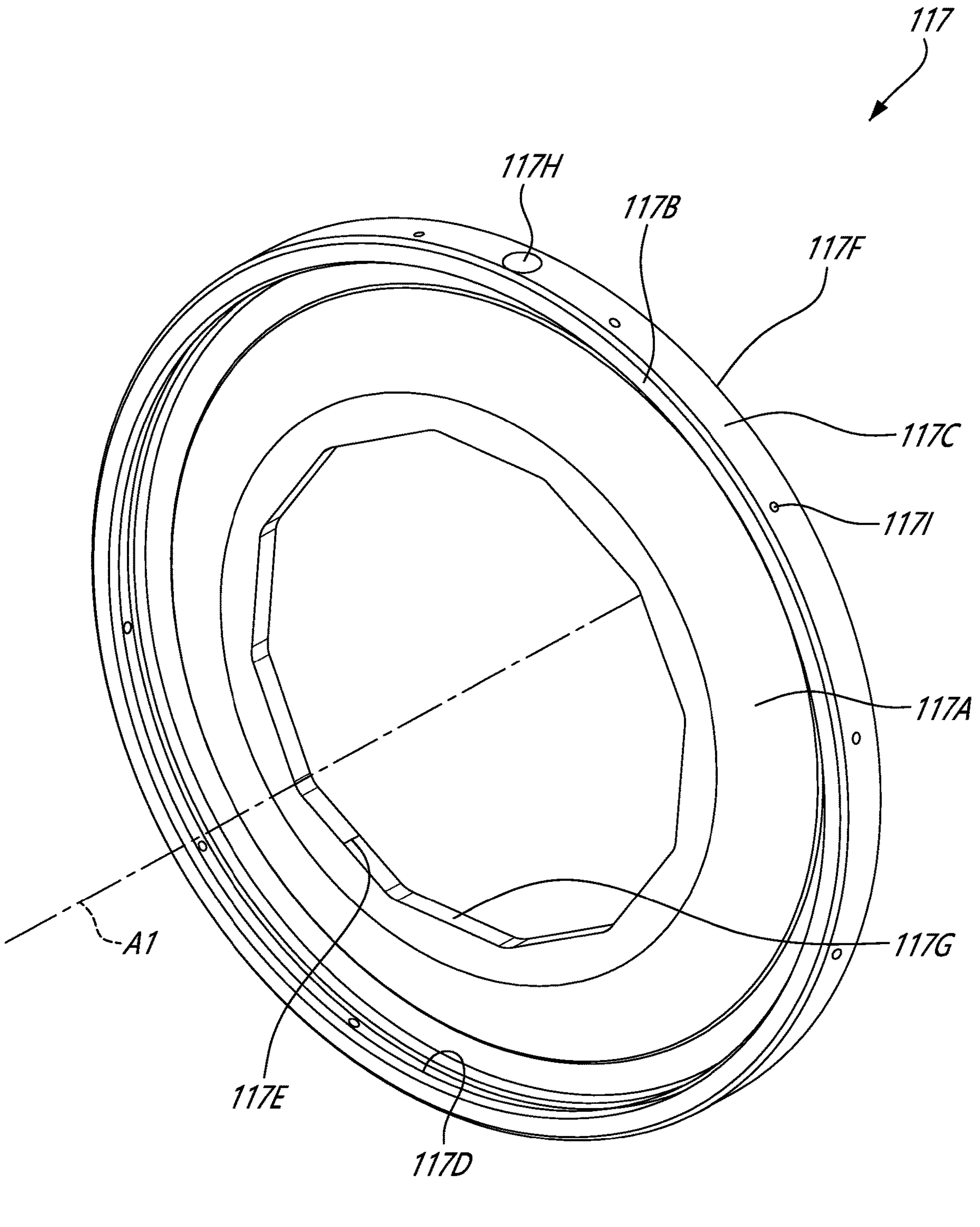
FIG. 13 is a three dimensional view of a nut used to secure the side plate to the side wall of the side housing of FIG. 8.

Referring now to FIGS. 11-13, in the embodiment shown, the side wall 14 defines wall threads 14K located within a second recess 14L. The second recess 14L extends from the recess 14C away from the side plate 116. The wall threads 14K are thus defined by a radially-inner face that extends around the axis A1 and around the second recess 14L. The wall threads 14K may therefore be inner threads since they face the axis A1.

The side housing 111 further includes a nut 117, which may also be referred to as a fastening member, used for securing the side plate 116 to the side wall 14. The nut 117 is rotatable about the axis A1. The nut 117 includes a web 117A and a flange 117B protruding axially from a radially-outer end of the web 117A. The flange 117B defines nut threads 117C located on a radially-outwardly facing face of the flange 117B. The nut threads 117C may thus be outer threads since they face away from the axis A1. The nut 117 is removably securable to the side wall 14 via a threading engagement of the wall threads 14K to the nut threads 117C. As shown in FIG. 12, the flange 117B of the nut 117 defines a nut groove 117D located on an opposite face of the flange 117B than the nut threads 117C. The nut threads 117C and the nut groove 117D may be located on opposite faces of the flange 117B. The nut groove 117D is axially aligned and is in register with the protrusion groove 116D. To this end, the protrusion 116C of the side plate 116 and the flange 117B of the nut 117 axially overlap one another. A portion of the flange 117B of the nut 117 is received within the groove 116F of the side plate 116. Thus, the groove 116F may allow to minimize an axial length of the flange 117B of the nut 117. However, in some embodiments, the groove 116F may be omitted.

As shown in FIG. 13, the nut 117 extends from a radially-inner face 117E defined by the web 117A and oriented towards the axis A1 to a radially-outer face 117F defined by the flange 117B and oriented away from the axis A1. As more clearly visible on FIG. 11, the radially-inner face 117E of the nut 117 is located radially inwardly of the central hole 116E of the side plate 116. The radially-inner face 117E defining torquing faces 117G sized to be engaged by a tool for rotating the nut about the axis A1. In one embodiment, the torquing faces 117G include twelve torquing faces circumferentially distributed about the axis A1 and configured to be engaged by a tool defining also twelve faces. Any number of torquing faces is contemplated. Alternatively, the nut 117 may define teeth/grooves at its inner diameter to be engaged by a correspondingly-shaped tool. Any suitable features may be provided on the nut 117 to permit its engagement by a tool to induce its rotation relative to the side plate 116.

The nut 117 may include inserts 117H extending through the flange 117B. The inserts 117H may be made of nylon or any suitable material. The inserts 117H may be deformed by the wall threads 14K and may provide frictional resistance against rotation to prevent the nut 117 from becoming loose over time. Any other suitable anti-rotation features may be used such as Spiralock™ or any suitable locking threads for instance. The inserts 117H may include only one insert or more than one insert distributed around the central axis A1. The nut 117 may define apertures 1171 extending radially through the flange 117B and communicating with the nut groove 117D. These apertures 1171 may be sized to receive a tool used to push on a retaining ring to remove the retaining ring from the nut groove 117D by pushing on the retaining ring outer diameter in order to temporally compress its diameter and permit the disengagement of the nut 117 from the side plate 16. The retaining ring is further described below.

As depicted in FIG. 12, the nut 117 and the side plate 116 are axially locked to one another while being rotatable one relative to the other about the axis A1. In the embodiment illustrated, a retaining ring 119 is used to axially lock the nut 117 to the side plate 116. In other words, a locking engagement is provided between the side plate 116 and the nut 117. It will be appreciated that any suitable retaining means may be used to axially lock the side plate 116 to the nut 117 while permitting rotation of the nut 117 about the axis A1 and relative to the side plate 116. For instance, a dog and slot arrangement may be possible, a tongue and groove, a keyway, and so on. Hence, the retaining ring 119 may be omitted in some embodiments.

In the embodiment shown, the side plate 116 is secured to the side wall 14 via the nut 117. Put differently, the side plate 116 is secured to the side wall 14 via a threading engagement between the nut threads 117C of the nut 117 and the wall threads 14K of the side wall 14 and via the retaining means. More specifically, in the exemplified embodiment, the retaining ring 119 is received conjointly within the nut groove 117D of the nut 117 and the protrusion groove 116D of the protrusion 116C of the side plate 116. The retaining ring 119 is thus in abutment against faces surrounding the nut groove 117D and the protrusion groove 116D such that any axial force exerted to separate the side plate 116 from the nut 117 is opposed by the retaining ring 119 abutting the faces bounding the nut groove 117D and the protrusion groove 116D.

It will be appreciated that, in some embodiments, the protrusion 116C of the side plate 116 may be omitted and that features of the protrusion described above may be provided within a circumferential recess extending from the back face 116B to the rotor-engaging face 116A of the side plate 116.

Still referring to FIG. 12, in the depicted embodiment, a sealing member 120 is received within a wall groove 14M defined by the side wall 14. The wall groove 14M may be alternatively defined by the side plate 116 or conjointly by the side wall and the side plate. The sealing member 120 is located radially-outwardly of the wall threads 14K of the side wall 14 and is in abutment against the back face 116B of the side plate 116. The sealing member 120 is thus compressed between the side wall 14 and the side plate 116. By disposing the sealing member 120 radially-outwardly of the wall threads 14K as shown, axial space savings may be obtained.

A depth of the second recess 14L taken in an axial direction relative to the axis A1 is greater than an axial width W1 of the nut 117. This creates an annular space S located axially between a bottom of the second recess 14L and the nut 117. This annular space S is devoid of the nut 117 and permits a flow F1 of lubricant to reach lubricant passages 14N of the side wall 14. The nut 117 thus may not obstruct the lubricant passages 14N.

Figure 14:
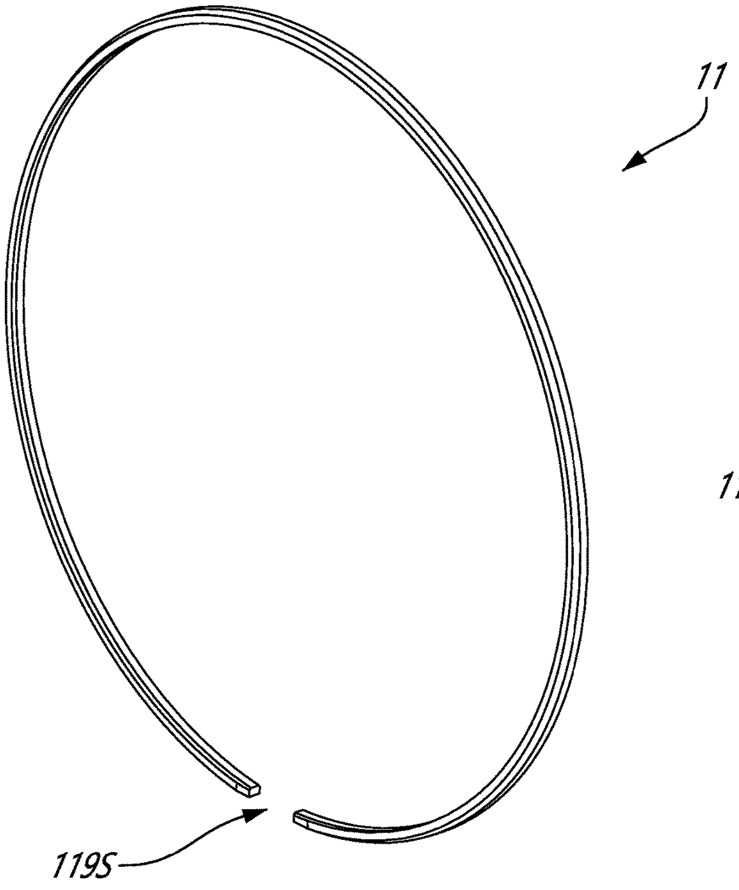
FIG. 14 is a three dimensional view of a retaining ring to secure the side plate to the nut of FIG. 13.
Figure 15:
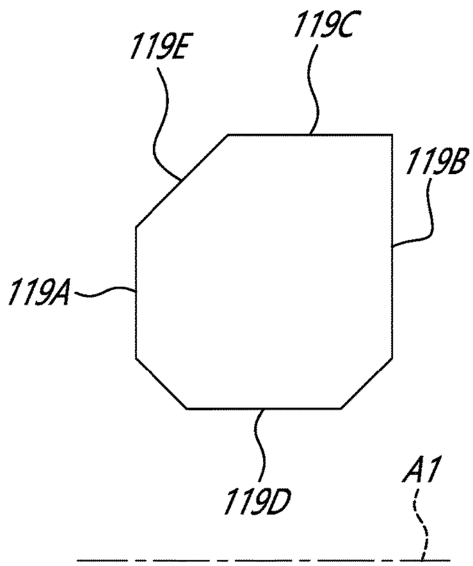
FIG. 15 is a cross-sectional view of the retaining ring of FIG. 14.
Figure 16:
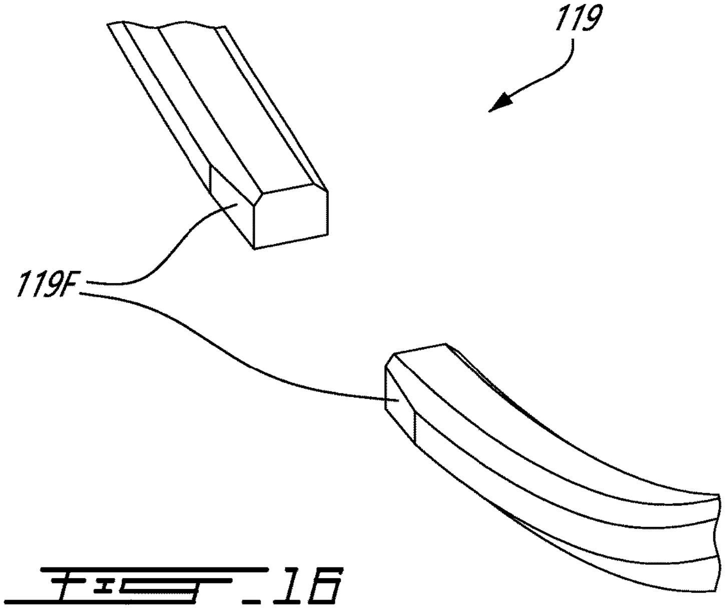
FIG. 16 is a three dimensional view of a portion of the retaining ring of FIG. 14.

Referring to FIGS. 14-16, the retaining ring 119 is described in greater detail. The retaining ring 119 is radially deformable. This allows the retaining ring 119 to be disposed within the protrusion groove 116D of the protrusion 116C of the side plate 116. In this embodiment, the retaining ring 119 defines a slit 119S permitting its radial deformation. The retaining ring 119 may thus be partially annular since the slit 119S is free of the retaining ring 119. An at-rest shape of the retaining ring 119 is shown in FIG. 12 and defines a diameter in which the retaining ring 119 is partially received within both of the protrusion groove 116D and the nut groove 117D.

As shown in FIG. 15, the retaining ring 119 has a first axial face 119A, a second axial face 119B opposed to the first axial face 119A, an outer radial face 119C oriented away from the axis A1, and an inner radial face 119D opposed to the outer radial face 119C and oriented towards the axis A1. As shown in FIG. 11, the first axial face 119A is oriented towards the side wall 14 whereas the second axial face 119B is oriented towards the side plate 116. In the illustrated embodiment, a chamfer 119E is provided at an intersection between the first axial face 119A and the outer radial face 119C. The chamfer 119E may be used to facilitate an assembly of the nut 117 to the side plate 116. More specifically, the chamfer 119E is located to abut the flange 117B of the nut 117, which may itself be provided with a chamfer, such that when moving the nut 117 and the side plate 116 axially one relative to the other, the flange 117B of the nut 117 abuts the chamfer 119E thereby pushing the retaining ring 119 radially inwardly towards the axis A1 and deeper into the protrusion groove 116D until the retaining ring 119 is axially aligned with the nut groove 117D. At which point, the retaining ring 119 is able to expand radially outwardly and snaps into place where it sits into the nut groove 117D. The retaining ring 119 is thus received conjointly in both the nut groove 117D and the protrusion groove 116D of the side plate 116 thereby axially locking the side plate 116 to the nut 117 while permitting rotation of the nut 117 relative to the side plate 116. The chamfer 119E may be omitted in some embodiments.

As shown in FIG. 16, the retaining ring 119 defines two tapers 119F located on opposite sides of the slits 119S. These tapers 119F are created by one of the first axial face 119A and the second axial face 119B extending towards the other of the first axial face 119A and the second axial face 119B and towards the slit 119S. The tapers may be defined by both axial faces. These tapers 119F may prevent the retaining ring 119 from biting into the protrusion 116C of the side plate 116 when rotating the nut 117 relative to the side plate 116.

Figure 17:
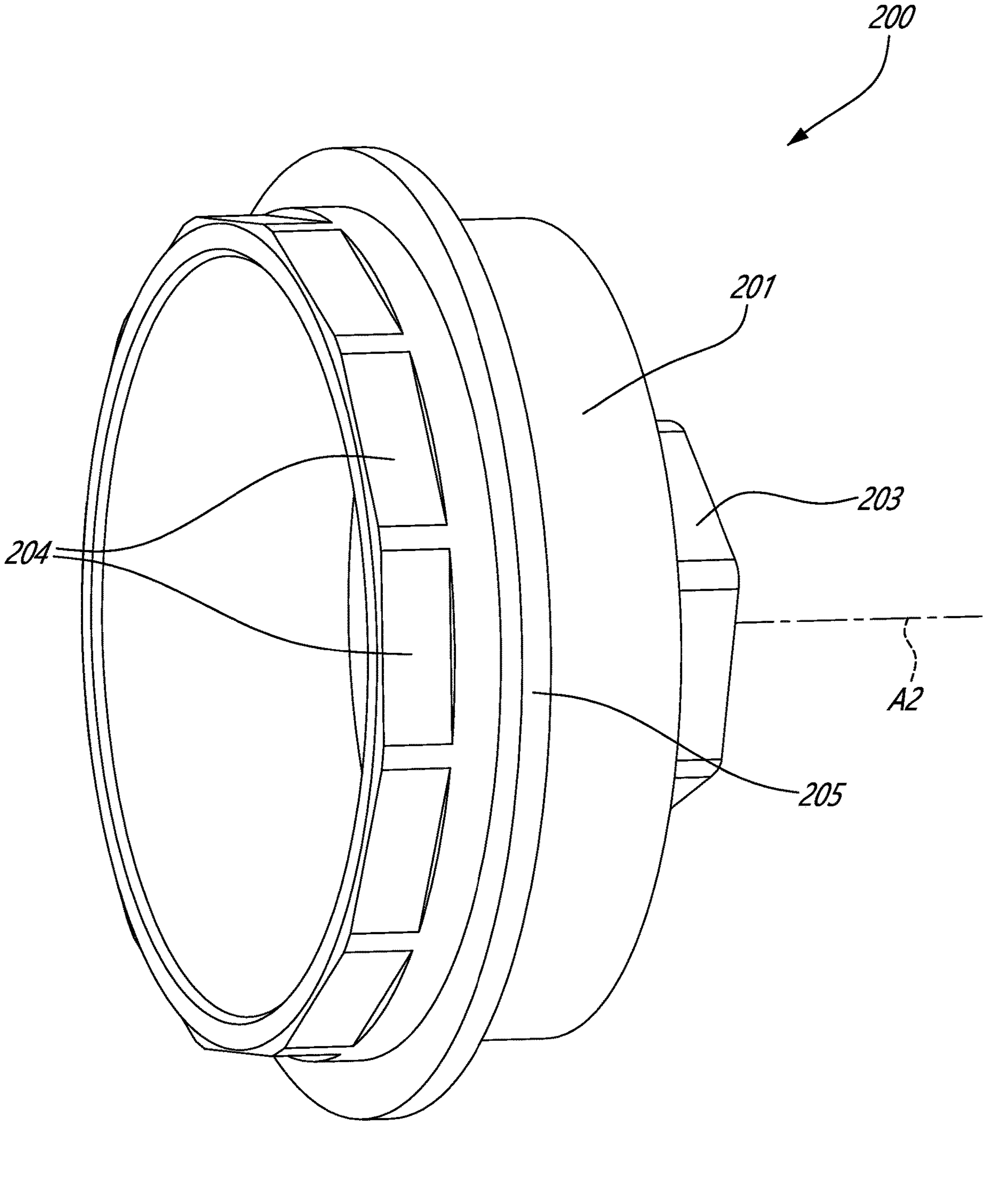
FIG. 17 is a three dimensional view of a tool for engaging the nut of FIG. 13.

Referring now to FIG. 17, a tool 200 to be used to rotate the nut 117 is shown. The tool 200 includes a cylindrical wall 201 extending around a tool axis A2. A web 202 (FIG. 19) is secured to the cylindrical wall 201 and extends transversally to the tool axis A2. A head 203 is secured to the web 202. The head 203 defines an hexagonal shape to be engaged by a wrench or any suitable tool. Other shapes of the head 2023 are contemplated. The cylindrical wall 201 defines torquing faces 204 sized to engage the torquing faces 117G (FIG. 13) of the nut 117. A stopper 205, provided in the form of an annular wall, is secured to the cylindrical wall 201 between the torquing faces 117G and the web 202.

To assemble the side plate 116 to the side wall 14, the retaining ring 119 may be expanded to be disposed around the protrusion 116C of the side plate 116 until it registers with the protrusion groove 116D of the side plate 116. The retaining ring 119 may thus contract into the protrusion groove 116D. At which point, the side plate 116 and the nut 117 may be moved axially one towards the other until the retaining ring 119 abuts the flange 117B of the nut 117 thereby pushing against the retaining ring 119 to contract it radially inwardly into the protrusion groove 116D until the retaining ring 119 becomes in register with the nut groove 117D and snaps into the nut groove 117D.

Figure 18:
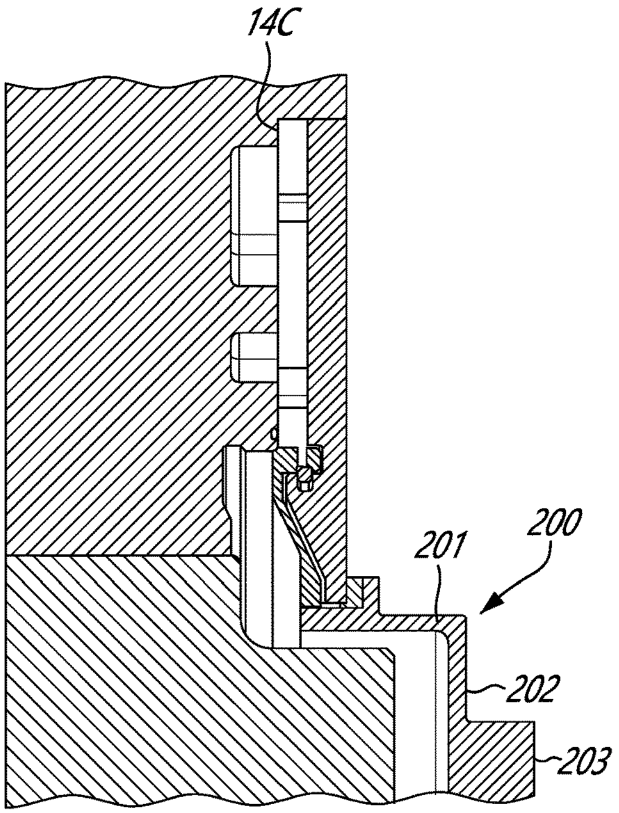
FIGS. 18-19 are cutaway views of the side housing of FIG. 8 and the tool of FIG. 17 illustrating an assembly process of the side plate to the side wall.
Figure 19:
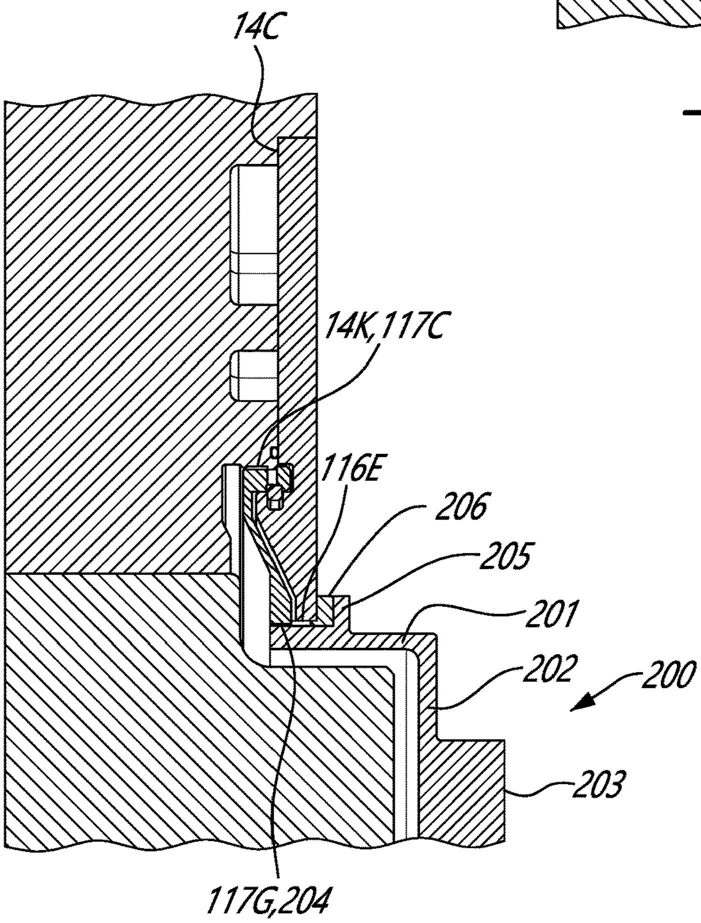

As shown in FIGS. 18-19, to fasten the nut 117 and the side plate 116 to the side wall 14, the tool 200 is inserted into the central hole 116E of the side plate 116 until the torquing faces 204 of the tool 200 engage the torquing faces 117G of the nut 117. A protective sleeve 206 may be disposed axially between the side plate 116 and the stopper 205. The protective sleeve 206 may be used to protect the rotor-engaging face 116A of the side plate 116 from the tool 200. At which point, the side plate 116 may be moved into the recess 14C until the wall threads 14K and the nut threads 117C abut one another. Then, the tool 200 may be used to rotate the nut 117 relative to the side plate 116 thereby threadingly engaging the wall threads 14K to the nut threads 117C until the side plate 116 is seated inside the recess 14C as shown in FIG. 19. At which point, the tool 200 may be removed. A clamping force exerted on the side plate 116 may be controlled via a torque applied on the tool 200.

A ratio of a thread diameter of the wall threads 14K of the side wall 14 to a diameter of the sealing member 120 may range from 0.96 to 0.98, preferably about 0.98; a ratio of the thread diameter of the wall threads 14K to a diameter of the central hole 116E of the side plate 116 may range from 1.5 to 1.75, preferably about 1.7; a ratio of the thread diameter of the wall threads 14K to a diameter of the nut 117 at the radially-inner face 117E may range from 1.5 to 1.89, preferably about 1.78. A ratio of the thread diameter of the wall threads 14K to a diameter of a location of a pressure relieve aperture (not shown), also referred to as a blow-by hole, may range from 0.83 to 0.92, preferably 0.873. A thickness ratio between outer and inner portions of the side plate 116 may range from 1.3 to 1.9 preferably 1.62. A shape of the pressure relieve aperture may be racetrack nominal diameter of. 0.081 inch to 0.246 inch. The inner and outer portions of the side plate 116 are in relation to the protrusion; the inner and outer portions are respectively located radially inwardly and outwardly of the protrusion.

In the context of the present disclosure, the expression "about" implies variations of plus or minus 10%.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A side housing for a rotary internal combustion engine, comprising:

a side wall defining first threads, the first threads extending around a central axis;

a side plate having a rotor-engaging side facing away from the side wall and a back side opposite the rotor-engaging side and facing the side wall; and a nut rotatable relative to the side plate about the central axis, the nut and the side plate axially locked to one another, the nut defining second threads extending around the central axis, the side plate secured to the side wall via a threading engagement between the first threads of the side wall and the second threads of the nut.

2. The side housing of claim 1, wherein the nut has a radially-inner face oriented towards the central axis and a radially-outer face oriented away from the central axis, the radially-outer face defining the second threads, the radially-inner face located radially inwardly of a central hole of the side plate, the radially-inner face defining torquing faces engagable by a tool for rotating the nut about the central axis.

3. The side housing of claim 1, wherein the nut and the side plate are axially locked to one another via a retaining ring.

4. The side housing of claim 3, wherein the side plate defines a protrusion extending from a back face of the side plate, the nut having a web and a flange extending axially from the web, the flange and the protrusion axially overlapping one another, the retaining ring disposed radially between the protrusion and the flange.

5. The side housing of claim 4, wherein a portion of the flange of the nut is received within a groove defined by the side plate.

6. The side housing of claim 4, wherein the retaining ring defines a first axial face oriented towards the side wall, a second axial face oriented towards the side plate, an inner face oriented towards the central axis, and an outer face oriented away from the central axis, the retaining ring defining a chamfer at an intersection between the first axial face and the outer face.

7. The side housing of claim 4, wherein the nut defines a nut groove at the flange and the protrusion defines a protrusion groove, the retaining ring received conjointly within both of the protrusion groove and the nut groove.

8. The side housing of claim 4, wherein the protrusion is monolithic with a remainder of the side plate.

9. The side housing of claim 1, wherein the side wall defines a recess surrounded by a radially-inner face oriented towards the central axis, the radially-inner face defining the first threads, the nut received within the recess, the nut having a radially-outer face oriented away from the central axis, the second threads defined by the radially-outer face.

10. The side housing of claim 9, wherein a depth of the recess is greater than an axial width of the nut, an annular space located between a bottom face of the recess and the nut.

11. The side housing of claim 1, comprising a sealing member received within a groove defined by one or more of the side plate and the side wall, the sealing member being located radially-outwardly of the first threads and of the second threads and compressed between the side plate and the side wall.

12. A rotary internal combustion engine comprising:

a rotor;

an outer body circumscribing a rotor cavity, the rotor received within the rotor cavity and rotatable within the rotor cavity relative to the outer body, the outer body having a rotor housing extending around a central axis, and side housings mounted to the rotor housing, the rotor cavity extending axially between the side housings, a side housing of the side housings having:

a side wall, first threads defined by the side wall and extending around a central axis;

a side plate having a rotor-engaging side facing the rotor a back side opposite the rotor-engaging side and facing the side wall; and a nut axially locked to the side plate and rotatable relative to the side plate, the nut having second threads threadingly engaged with the first threads of the side wall.

13. The rotary internal combustion engine of claim 12, wherein the nut extends from a radially-inner face oriented towards the central axis to a radially-outer face oriented away from the central axis, the radially-outer face defining the second threads, the radially-inner face located radially inwardly of a central hole of the side plate, the radially-inner face defining torquing faces to be engaged by a tool for rotating the nut about the central axis.

14. The rotary internal combustion engine of claim 12, wherein the nut and the side plate are axially locked to one another via a retaining ring.

15. The rotary internal combustion engine of claim 14, wherein the side plate defines a protrusion extending from a back face of the side, the nut having a web and a flange extending axially from the web, the flange and the protrusion axially overlapping one another, the retaining ring disposed radially between the protrusion and the flange.

16. The rotary internal combustion engine of claim 15, wherein the nut defines a nut groove at the flange and the protrusion defines a protrusion groove, the retaining ring received conjointly within both of the protrusion groove and the nut groove.

17. The rotary internal combustion engine of claim 15, wherein the protrusion is monolithic with a remainder of the side plate.

18. The rotary internal combustion engine of claim 12, wherein the side wall defines a recess surrounded by a radially-inner face defining the first threads, the radially-inner face oriented towards the central axis, the nut received within the recess, the nut having a radially-outer face oriented away from the central axis, the second threads defined by the radially-outer face.

19. The rotary internal combustion engine of claim 18, wherein a depth of the recess is greater than an axial width of the nut, an annular space located between a bottom face of the recess and the nut.

20. The rotary internal combustion engine of claim 12, comprising a sealing member received within a groove defined by one or more of the side plate and the side wall, the sealing member being located radially-outwardly of the first threads and of the second threads and in abutment against the back face of the side plate.

* * * * *